Patented Apr. 21, 1953

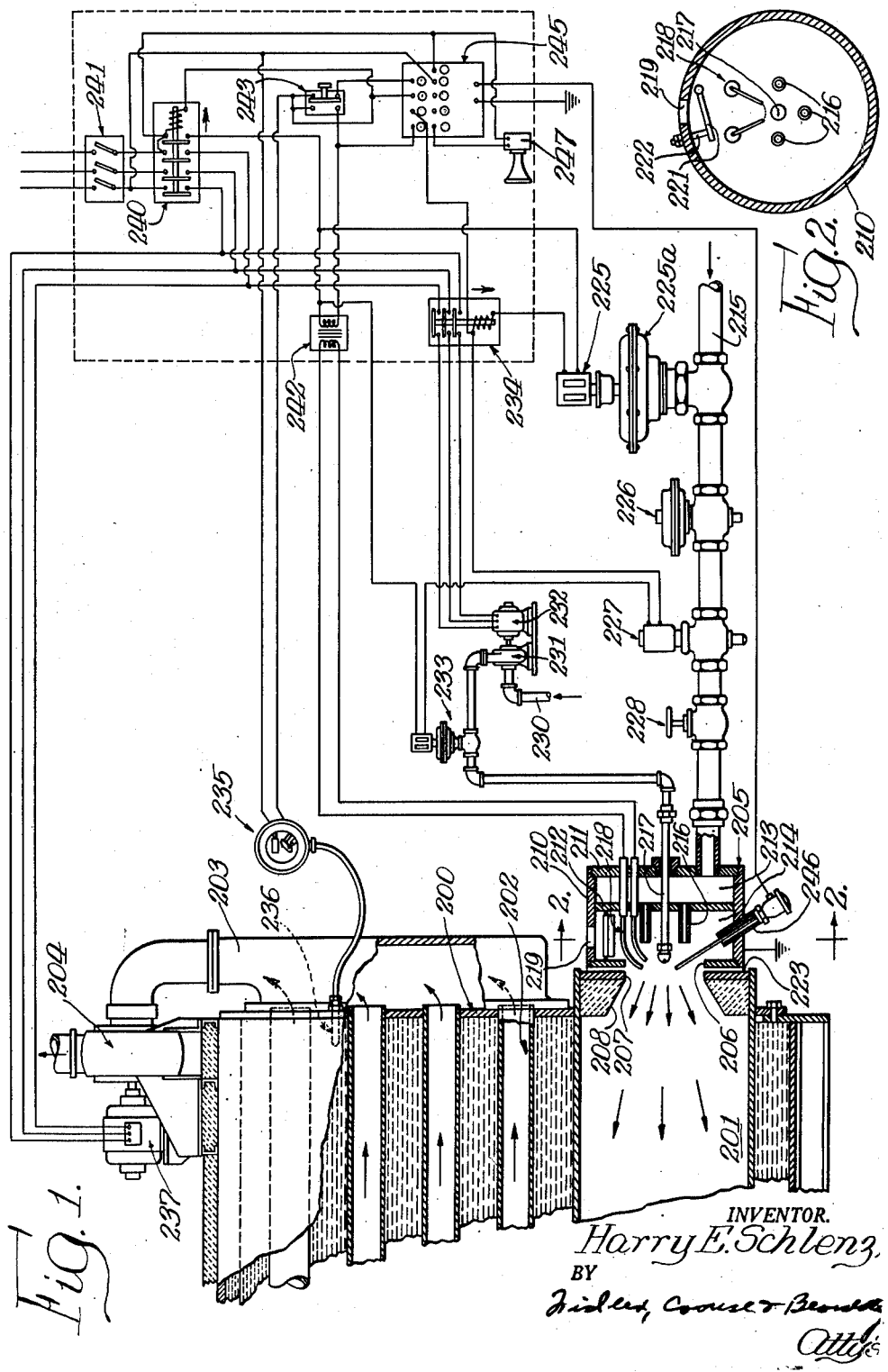

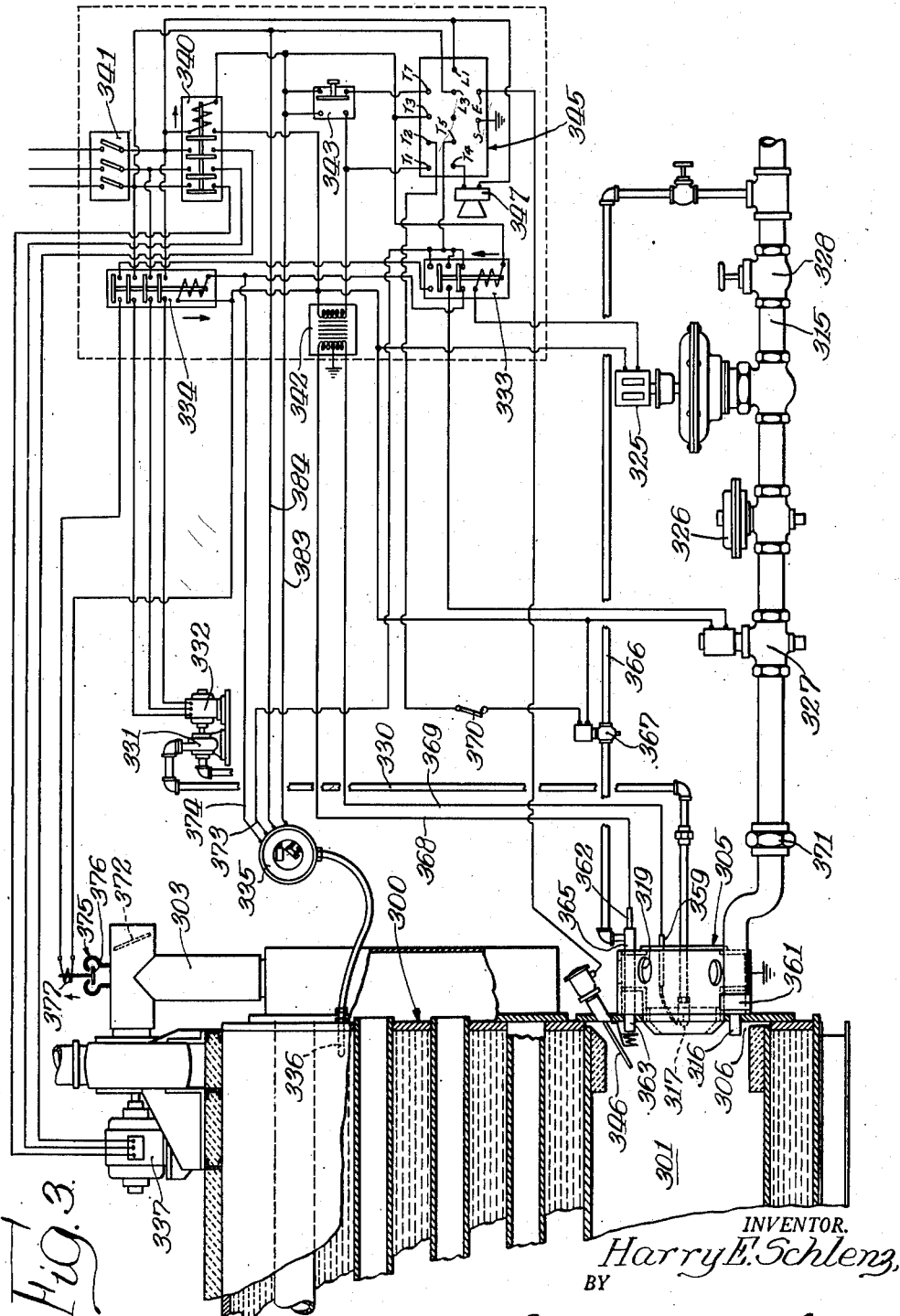

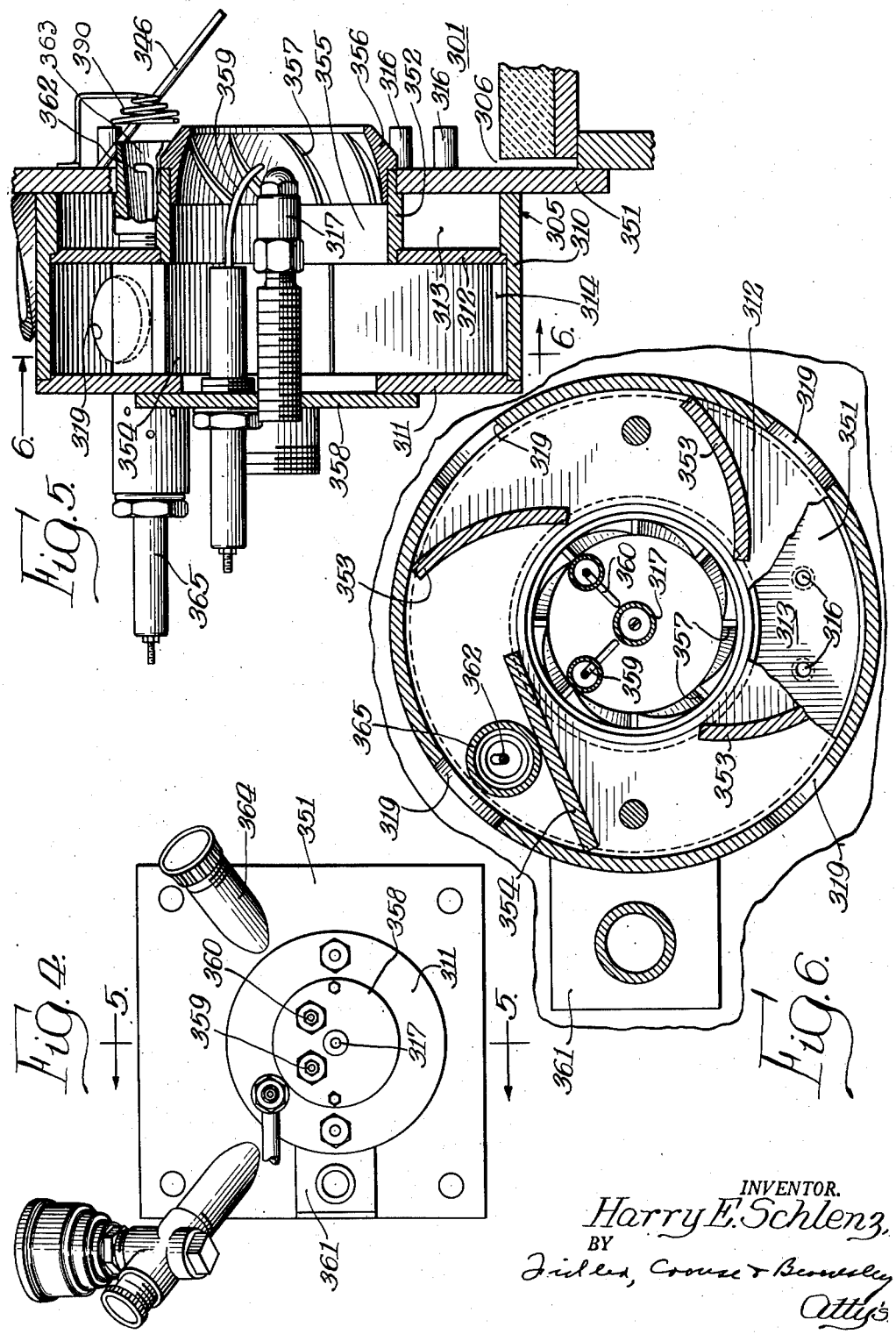

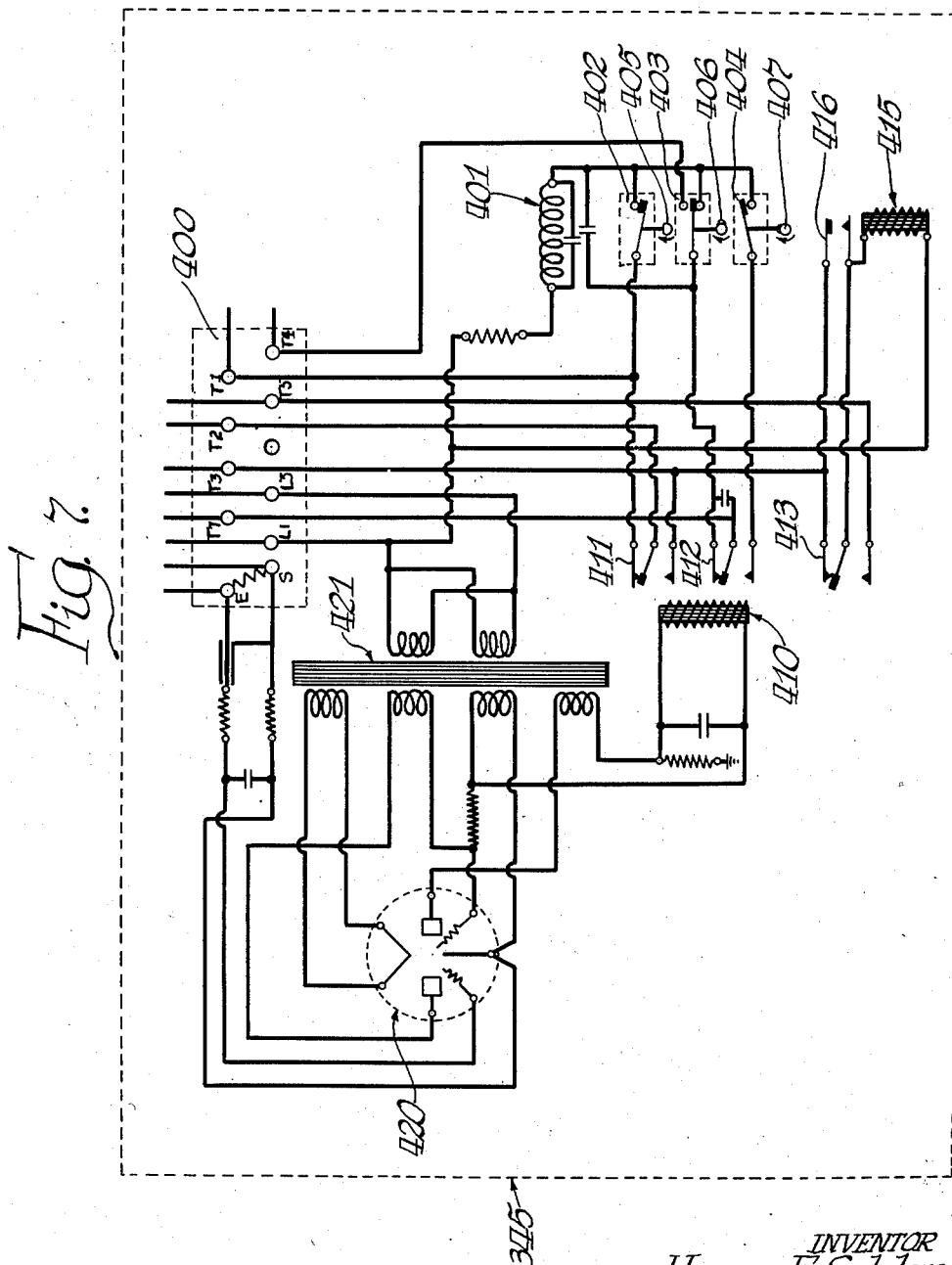

2,635,813

UNITED STATES PATENT OFFICE 2,635,813

FURNACE AND CONTROL SYSTEM FOR GASEOUS AND LIQUID FUEL BURNERS

Harry E. Schlenz, Glencoe, Ill., assignor to Pacific Flush Tank Company, Chicago, Ill., a corporation of Illinois Application November 3, 1948, Serial No. 58,055

2 Claims. (Cl. 236—1)

This invention relates to burners for fluid fuels and has to do particularly with a novel burner capable of operating with either gaseous or liquid fuel.

In certain installations where gas-fired burners are employed, it is often found that the supply of gas may fluctuate and may not be sufficient at all times to provide the necessary heat. For example, in a system for treating sewage, the sludge or the digester liquor from the sewage sludge digester is often heated by burning the gas generated in the digester. The gas thus generated may not be sufficient and it may be desirable to utilize an additional source of fuel in order to provide sufficient heat to maintain the continuity of the digesting process. This is especially true where undue colder weather is encountered and the gas generated is insufficient to maintain the desired temperature in the digester. With a drop in the digester temperature, the rate of gas production drops, further reducing the gas available for heating. If this self-perpetuating cycle is allowed to continue, the lowered temperature in the digester will cause such a drop in the digestion rate that the process may be almost completely halted. Thus, it is imperative for proper operation and efficiency that additional fuel be provided. It will also be understood that in sewage treatment systems, as well as in other installations where gas is employed for heating, the gas supply may be interrupted making it desirable to utilize a standby source of fuel in order to maintain the heating operation until the gas supply can be re-established. On the other hand, it may be desirable for reasons of economy to utilize oil as the primary fuel but be able to use gas so that in the event of temporary exhaustion of the oil supply, the burner may continue in operation until the oil supply has been re-established.

An object of the present invention is to provide a new and improved burner for fluid fuels and control system therefor.

Another object is to provide a burner and control system therefor capable of operating with either gaseous fuel or liquid fuel, or both simultaneously.

Another object is to provide a burner capable of operating with either gaseous fuel or liquid fuel, or both simultaneously and a fully automatic control system for the burner.

Another object is to provide a burner and control system therefor for fluid fuels which is capable of burning either gaseous or liquid fuel, or both, the operation being controlled entirely automatically and without requiring manual control for changing from one type of fuel to another.

A further object is to provide a burner and control system therefor capable of burning gaseous fuel or liquid fuel, or both, and wherein the supply of liquid fuel to the burner is controlled automatically in accordance with the pressure of the gaseous fuel supply, whereby upon a decrease in the availability of gaseous fuel in the burner below a predetermined minimum, liquid fuel is supplied in lieu of or in addition to the gaseous fuel.

Still a further object is to provide a burner and control system therefor capable of burning gaseous or liquid fuel, or both, without requiring any change in or adjustment of the air inlet and which operates without howling or blast.

A further object is to provide a burner and control system therefor capable of burning gaseous or liquid fuels, or both, which is simple and compact, which may be easily manufactured and installed, and which operated with a minimum of attention, repair, and adjustment over a long period of use.

Other objects and advantages of the invention will appear from the following description taken in connection with the appended drawings, wherein:

Figure 1 is a somewhat diagrammatic view showing a burner and control system therefor constructed in accordance with the invention, the burner being shown for purposes of illustration in connection with one form of heater to which the burner is particularly well adapted;

Fig. 2 is a view of a section taken along line 2—2 of Fig. 1;

Fig. 3 is a somewhat diagrammatic view showing another embodiment of burner and control system in accordance with my invention;

Fig. 4 is an enlarged fragmentary front elevational view of the burner of Fig. 3;

Fig. 5 is an enlarged vertical sectional view taken along line 5—5 of Fig. 4;

Fig. 6 is a transverse sectional view taken along line 6—6 of Fig. 4; and

Fig. 7 is a schematic view of the elements and connections within the safety control device 345 shown diagrammatically in Fig. 3.

This application is a continuation-in-part of my co-pending application S. N. 673,659, filed May 31, 1946, for Apparatus for Heating Materials, now Patent No. 2,586,998, granted February 26, 1952.

It will be understood that the burner and control system in accordance with the present invention is well adapted for use in a large number of different types of installations where it is desired to provide heat and where both gaseous and liquid fuels are available. It will be understood further that the burner may be employed for burning either gaseous or liquid fuel alone but it is primarily intended for use where both types of fuels are available. For the purposes of illustration, the burner is disclosed herein in connection with a heater such as disclosed in my aforementioned co-pending application, but it will be understood that the invention is not limited to use with such heater.

The heater comprises a tank 200 providing a water bath through which extends one or more liquid coils (not shown) adapted to conduct the liquid to be heated through the water bath. Also disposed in the water bath is a fire box or combustion chamber 201 suitably connected to a fire tube assembly 202 comprising preferably a plurality of tubes suitably connected to the combustion chamber and through which heated gases may pass in heat exchange relation with the water of the water bath in the tank 200. The fire tube assembly 202 is connected to an outlet 203 having an exhaust fan 204 driven by an electric motor 237 all for creating a draft through the combustion chamber and fire tube assembly in the usual manner.

The burner includes a casing 205 which preferably is of generally cylindrical form and preferably is disposed outside of the combustion chamber 201. The casing 205 is provided with an outlet opening 206 which registers with an opening 207 leading into the combustion chamber 201. Surrounding the opening 207, and disposed inside of the combustion chamber 201 is a fire brick tuyère 208 of generally annular shape and having a flared passage leading into the combustion chamber.

The casing 205 includes a side wall 210, an end wall 211 and a partition 212, all defining an outer or manifold chamber 213 and an inner or ignition chamber 214 in which the fuel is ignited and in which combustion also may take place. A gas inlet pipe 215 leads into the manifold chamber 213 and a plurality of nozzles or burner heads 216 communicating with the manifold chamber 213 are mounted in the partition 212 and terminate in the ignition chamber 214. A liquid fuel nozzle 217 extends through the front wall 211 and partition 212 and terminates in the ignition chamber 214. Preferably the gas nozzles 216 are arranged in distributed relation, as in a circle (Fig. 2), and the liquid fuel nozzle 217 is disposed centrally of the arrangement of gas nozzles 216.

An ignition device 218 of any conventional form is mounted and preferably consists of the usual spark gap electrodes which are disposed in position to ignite the fuel ejected from either the gas nozzles 216 or the liquid fuel nozzle 217.

A primary air inlet 219 is provided in the side wall of the burner casing 205, preferably at the upper portion thereof, and the air intake through the inlet is controlled by an adjustable air valve of suitable construction. Preferably the air valve includes a shutter or deflector 221 pivotally mounted in the casing 205 and having an adjusting stud 222 connected thereto and extending through the side wall 210 whereby the free end of the shutter 221 can be moved toward or away from the opening 219 to control the sides of the passage defined between the shutter and the adjacent portion of the side wall. Secondary air is introduced into the combustion chamber preferably by so mounting the casing 205 relative to the combustion chamber that a space 223 is provided which serves as a secondary inlet of generally annular form.

The operation of the burner may be controlled by a suitable combination of standard electrical and pressure control devices. In a preferred mode of operation of the burner, gas is supplied as the primary fuel and fuel oil is supplied as the auxiliary or supplemental fuel. When the supply of gas is sufficient, the pressure in the gas supply line permits the gas to be supplied to the gas nozzles and no oil is normally supplied to the oil nozzle. However, when the supply of gas drops below the minimum required for producing the desired heat, control means responsive to the pressure of the gas in the gas supply line is effective to supply oil to the liquid fuel nozzle. The control arrangement is such that when the gas pressure falls to below a minimum pressure and it is necessary to supply oil, the gas is cut off and only oil is supplied to the burner nozzle. However, if desired the control means for the oil supply may be actuated to supply oil simultaneously with the gas when the pressure of the latter falls below a certain value, or when the heating demand is greater than the supply of gas alone will provide.

A control system is controlled by thermostatic means which causes the burner to operate at all times when heat is necessary in the liquid bath. Moreover, safety devices are provided of a standard type which close off all fuel supply in the event the system is calling for heat and the flame does not burn or cannot be ignited automatically by the system.

One suitable arrangement of control device for effecting the foregoing operation of the burner is illustrated somewhat diagrammatically in Fig. 1. The gas supply line 215, which is connected to a suitable source (not shown) of gas supply, includes a switch 225 controlled by the pressure of the gas supply by a diaphragm pressure device 225a, a pressure regulator 226 for maintaining a uniform gas pressure at the gas nozzles, an electrically operated gas control valve 227 and a manually operated gas control valve 228.

The oil supply line 230 includes an oil pump 231 driven by an electric motor 232 and a pressure switch 233 controlled by the pressure of the oil in the discharge line at 233. The oil pump motor 232 is controlled by a relay 234 which in turn is controlled by the pressure switch 225 so that when the gas pressure in the line 215 falls below a predetermined minimum value the motor 232 is energized to drive the oil pump 231. The pressure switch 233 is connected to the gas control valve 227 whereby when the pressure in the oil line at 233 reaches a predetermined minimum value the valve 227 is closed to shut off the supply of gas.

A switch 235 is provided for controlling the gas control valve 227 and the relay 234 and is actuated by a thermostatic bulb 236 disposed in the liquid bath and responsive to the temperature thereof to actuate the switch 235.

The suction fan 204 is driven by a motor 237 which is controlled by a starting relay 240 connected through a main switch 241 to a suitable power supply.

The spark gap 218 is connected to a spark coil 242 which is controlled by the starting relay 240 during normal operation.

The system is started by closing the main switch 241. If the system is calling for heat, the switch 235 is closed by the thermostat 236 and energizes the coil of the starting relay 240 to close the latter. The fan motor 237 is thereby energized to drive the exhaust fan 204. At the same time the ignition coil 242 is energized to provide a spark at the spark gap 218 for igniting the fuel. The ignition coil 242 may be energized for a predetermined period, for example, 25 seconds, during the starting of the burner or it may be energized continuously so long as the system is in operation. This may be accomplished in any well known manner.

If the pressure in the gas supply line 215 is sufficient, the pressure switch 225 is actuated to cause the electrically operated gas valve 227 to open and permit gas to pass into the manifold chamber 213 and thence through the nozzles 216 into the ignition chamber 214 where the gas is ignited by the spark gap 218. The pressure regulator 226 insures that the gas is supplied at uniform minimum pressure to the manifold chamber 213.

If the pressure in the gas line 215 is insufficient to support proper combustion or to provide the sufficient combustion to meet the desired heat requirements, the pressure actuated switch 225 is operated to close the relay 234 and energize the oil pump motor 232. When a predetermined pressure, for example, around 90 lbs., is developed in the oil supply line discharge at 233 the pressure actuated switch 233 opens the circuit through the electrically operated gas valve 227 which causes the valve to close and shut off the supply of gas to the manifold chamber 213. The burner then continues to operate with the oil being supplied by the oil line 230 to the oil nozzle 212.

When the quantity of gas available increases to the extent that a predetermination minimum pressure is developed in the supply line 215, the pressure actuated switch 225 is operated to open the relay 234 and de-energize the oil pump motor 232. As soon as the oil pressure falls below a predetermined value, for example, around 70 lbs., the pressure actuated switch 233 closes and causes the electrically operated gas valve 227 to open and permit gas to flow to the manifold chamber 213 in the manner above described.

If the heat requirements of the bath are satisfied at any time, the thermostatically controlled switch 235 is opened, thereby opening the circuit through the valve 227 causing it to close and cut off the gas supply. At the same time the circuit through the switch 225 is opened so that if the relay 234 happens to be closed it will be opened to de-energize the motor 232, or if it is opened, it cannot be closed to energize the oil pump motor 232. If, when the switch 235 is opened, the valve 227 happens to be closed, it will remain closed. The opening of the switch 235 also causes the starting relay 240 to open and thereby stop the exhaust fan motor 237 and de-energize the ignition coil 242.

If, when the main switch 241 is closed to start the burner, the heat requirements of the system are satisfied, the system will be placed in condition to operate but will await the heat demand and will supply fuel and ignite the flame in accordance with the demands indicated by the thermostat in the water bath.

Preferably, suitable safety control means are provided for insuring that the fuel supply will be cut off at any time if the flame should be extinguished and cannot immediately be re-established by the system. Such a device is indicated diagrammatically at 245 and may include any suitable type of safety control device for performing the functions herein described, such as the "Flame-Otrol" manufactured by the Wheelco Instruments Company of Chicago, Illinois. The safety control device 245 is the same as the device 345 illustrated more in detail in Fig. 7 and described hereinafter.

The safety control device 245 is connected to a flame rod or electrode 246 projecting through the wall of the casing 205 and into position to be disposed within the flames from one of the gas nozzles 216 and from the liquid fuel nozzle 217. The flame rod 246 is suitably connected in a known manner to the safety control device 245 and operates upon the well known electrical conductivity of the flame principle to permit the various control circuits above described to be completed so long as a flame is projected from either of the nozzles. However, in the event that the unit should be calling for heat and no flame exists, the control device 245 is actuated to close both the gas and oil fuel supply lines, but allows the exhaust fan 204 to continue operating to purge the system of gas so long as the unit requires heat. If desired an alarm horn 246 may be provided which also is actuated by the safety device 245 to sound an alarm when the above conditions exist.

The safety device 245 preferably includes means for automatically re-cycling the system prior to sounding the alarm horn 247 in an attempt to re-establish the flame. This is effected by the safety device 245 which opens the gas line or oil line (depending upon whether or not gas pressure in the gas line 215 is sufficient), energizing the ignition coil 242. If the flame cannot be re-established in this manner, the alarm horn 246 is sounded. A manually operated push button switch 243 is provided which is connected to the various controls above described in such manner that the system can be re-cycled to re-establish the flame after the system has been de-activated by the operation of the safety device 245, and the system does not succeed in automatically re-establishing the flame. However, if upon actuation of the push button switch 245 the flame cannot be re-established, the safety device 245 will cause the entire system to be de-activated as soon as the push button is released, and to remain so until the defect in the system which causes extinguishment of the flame can be corrected.

A somewhat modified form of burner and control system is illustrated in Figs. 3 to 7 of the drawings, to which reference now is made. It will be understood that where such modification is not described in detail, it is similar to the embodiment above described.

The burner includes a casing 305 having a rear wall 351 which also preferably serves as a mounting plate for mounting the burner on the front wall of the tank 300 and for closing the forward open end 306 of the combustion chamber or fire box 301. The casing 305 includes also a side wall 310, a front wall 311, a transverse partition 312 and a cylindrical partition 352 which members define an outer or air inlet chamber 314 and an inner or gas manifold chamber 313. A plurality (preferably four) of air inlets 319 are provided in the side wall 310 and adjacent the air inlets are deflector vanes 353 and 354 arranged to impart a spiral flow to air drawn into the air chamber through the air inlets 319. The deflector vanes 353 are of arcuate cross-sectional shape in order to further aid in imparting a spiral motion to the air, the fourth vane 354 being straight to permit a gas pilot burner 365, hereinafter more fully described, to extend through the casing. The cylindrical partition 352 defines a passage 355 forming a rearward extension of the air inlet chamber, and an air cone 356 provides a continuation of such passage discharging into the fire box 301. The air cone 356 has peripherally arranged, internal, spiral vanes 357 which serve additionally to impart a spiral flow to the air stream as it passes from the air inlet passage into the fire box.

A liquid fuel nozzle 317 extends into the casing through a closure and mounting plate 358 suitably secured to the rear wall 311 and terminates within the air cone 356. The nozzle 317 is disposed centrally of the casing and of the discharge outlet whereby the air stream flowing through the latter when the burner is in operation surrounds the nozzle and the jet of liquid fuel ejected therefrom. A pair of electrodes 359 and 360 which may be suitably connected in the control system hereinafter more fully described are carried by the rear wall 351 and terminate adjacent and suitably spaced from the inner end of the liquid fuel nozzle 317.

A main gas inlet 361 is disposed laterally of the casing 305 and leads into the gas manifold chamber 313 at one side thereof. A plurality of gaseous fuel nozzles or gas jet tubes 316 are mounted in the rear wall 311 and project into the fire box 301, the rear ends of these tubes leading from the gas manifold chamber 313 whereby the gas may flow from the manifold chamber through the nozzles 316 and into the fire box 301. The gaseous fuel nozzles 316 are disposed preferably in spaced relation and in a circumferential arrangement co-axially with the liquid fuel nozzle 317 and the passage 355 whereby the jets of gas issuing from the gaseous fuel nozzles 316 are located around the stream of air flowing from the air cone 356 and into the fire box 301. Thus it will be seen that the combustion air stream at the point of initial burning of both the liquid and gaseous fuel surrounds the atomized liquid fuel ejected from the liquid fuel nozzle 317 but is inside of the jets of gaseous fuel passing from the gaseous fuel nozzles 316. Because of the arrangement of deflector vanes 353 and 354 and the air cone vanes 357, the air has a spiral flow, particularly at the point of initial burning and therefore is thoroughly mixed with either the liquid fuel or the gaseous fuel or both, depending upon whether either or both of such fuels is being supplied.

The gas pilot burner 365 of suitable form extends through the casing 305 and is suitably supported therein as by mounting in the partition 312. The gas pilot burner 365 discharges into the fire box 301 within the circle of gaseous fuel nozzles 316. A spark electrode 362 extends in the pilot burner 365 to provide a spark gap with a ground 363 in order to provide for igniting the gaseous fuel ejected from the gas pilot burner 365.

A peep sight 364 may be provided, if desired, for inspecting the flame within the fire box 301.

A shielding grid 390 is provided for the purpose of trapping any ions which might otherwise pass from the pilot burner to the flame rod 346, hereinafter described, causing erratic operation to the flame safety device.

One illustrative arrangement of suitable control system for controlling the operation of the modified form of burner is illustrated somewhat diagrammatically in Figure 3 of the drawings. A gas supply line 315, which leads to the gas inlet 361, includes a manually operated gas control valve 328, a pressure-actuated switch 325, a pressure regulator 326, and an electrically operated gas control valve 327.

The gas pilot burner 365 is supplied with gas through a pilot line 366 connected to the main supply line beyond the valve 328, and the flow of gas in the pilot line is controlled by an electrically actuated valve 367 controlled as hereinafter described more in detail.

An ignition coil 342, controlled by the starting relay 340 during normal operation, is provided and the secondary of this coil is connected at one side by a lead 368 to the electrode 362, thereby to provide a spark between the electrode 362 and the ground 363 for igniting the gaseous fuel at the pilot burner. At the other side, the secondary of the spark coil 342 is connected by a lead 369 to the electrode 359 adjacent the liquid fuel nozzle 317. Where a spark is to be established at the liquid fuel nozzle 317 instead of at the gas pilot burner, the lead 368 is removed from the electrode 362 and is connected to the electrode 360 (Fig. 6). It will be noted that the secondary of the coil 342 is grounded at its midpoint so that when the lead 368 is connected to the electrode 362, there is no circuit completed through the electrode 360 and there will be no spark established at the liquid fuel nozzle.

An oil supply line 330, leading to the liquid fuel nozzle 317, includes an oil pump 331 driven by a motor 332, controlled by a relay 334 which in turn is controlled by the pressure-actuated switch 325 so that when the gas pressure in the line 315 falls below a predetermined minimum value, the motor 332 is energized to drive the oil pump 331.

A switch 335 actuated by a thermostatic bulb 336 in the water bath and responsive to the temperature thereof is provided with a principal set of contacts (not shown) connected to leads 383 and 384 for controlling the gas control valve 327 and the relay 334.

The suction fan motor 337 is controlled by a starting relay 340 connected through a main, manually operated switch 341 to a suitable power supply (not shown).

The system operates in a manner generally similar to the system shown in Fig. 1. The system is started by closing the main switch 341. If the system is calling for heat, the principal contacts of the switch 335 are closed by the thermostat 336 and the starting relay 340 is energized. At the same time, the ignition coil 342 is energized to provide a spark at the spark gap of the gas pilot 365 (if the lead 368 is connected to the electrode 362), and the gas pilot valve 367 is opened to allow gas to pass to the pilot burner 365 where the small flow of gas is ignited. The ignition coil 342 may be energized in any well known manner, either for a predetermined period during the starting, or continuously while the system is in operation.

If the pressure in the gas supply line 315 is sufficient, the switch 325 is closed to energize the relay 333 and open the valve 327 to permit gas to pass into the gas manifold chamber 313 and thence through the nozzles 316 into the combustion chamber 301 where the gas is ignited by the gas pilot burner 365.

If the pressure in the gas line 315 is insufficient to support proper combustion, the switch 325 is open and the relay 333 operates to energize the relay 334 and close the circuit through the motor 332. At the same time the relay 333 opens the circuit through the valve 327 to close the latter and shut off the gas to the gas manifold chamber 313. However, the circuit is maintained through the valve 367 so that gas continues to be supplied to the pilot burner. The burner then continues to operate with the oil being supplied by the oil line 330.

When the quantity of gas available increases sufficiently to develop a predetermined minimum pressure in the supply line 315, the switch 325 operates the relay 333 to open the relay 334 and de-energize the oil pump motor 332, and at the same time to open the valve 327 and permit gas to flow to the gas manifold chamber 313 as above described.

Should the heat requirements of the bath become satisfied, the switch 335 is opened to close the valve 327 which cuts off the gas supply. At the same time, the circuit through the switch 325 is opened so that if the relay 334 happens to be closed it will be opened to de-energize the motor 332 or if it is opened, it cannot be closed to energize the oil pump motor 332. If, when the switch 335 is opened, the valve 327 happens to be closed, it will remain closed. The opening of the switch 335 also causes the starting relay 340 to open and thereby stop the exhaust fan motor 337 and de-energize the ignition coil 342.

If, when the main switch is closed to start the burner, the heat requirements of the system are satisfied, the system will be placed in condition to operate but will await the heat demand and will supply fuel and ignite the flame in accordance with the demands indicated by the thermostat in the water bath.

If desired, the oil or gas fuel may be directly ignited by the spark gap between the electrodes 359 and 360 established by connecting the high tension lead 368 to the electrode 360. In such case, the circuit through the gas pilot valve 367 is opened (as by a switch 370) and fuel is supplied by energizing of the valve 327 for gas burning, or the fuel pump motor 332 for oil burning by the same sequence as indicated above.

Preferably, suitable safety control means are provided such as the safety control device 345 which may be generally similar to the device 245 above mentioned. The safety control device 345 is connected to a flame rod or electrode 346 in a known manner to permit the various control circuits above described to be completed so long as a flame is projected from either of the nozzles, but to close both the gas and oil fuel supply lines should the unit be calling for heat when no flame exists.

The safety device 345 preferably includes an alarm 347 and means generally similar to the means described in connection with the device 245 for automatically re-cycling the system prior to sounding the alarm in an attempt to re-establish the flame and as illustrated is a "Flame-Otrol" unit similar to the unit 245. It also includes a manually operated push button for re-cycling the system once should the system not succeed in automatically re-establishing the flame after failure of the flame, as above described.

Reference is now made to Fig. 7, which is a schematic showing of the back of the terminal plate 400 of the safety control device 345, together with the principal elements of the device and their connections. The device includes a program motor 401 adapted to control program switches 402, 403 and 404 by means of suitable operating cams 405, 406 and 407 respectively, mounted on a switch cam shaft (not shown) driven by the motor 401. The program motor 401 and switches 402, 403 and 404 are suitably arranged and connected to provide the desired timing or cycling hereinafter described. A relay 410 having switches 411, 412 and 413 is provided for suitably connecting the external circuits as hereinafter explained. A holding relay 415 is provided for locking in certain connections as hereinafter explained. A vacuum tube 420 powered by a transformer 421 is provided and is suitably connected for operating the relay 410 under the conditions hereinafter described.

The several internal elements of the safety control device 345 are suitably interconnected and the circuits therefrom lead to the several terminals on the terminal plate 400 to which the external circuits of the system are connected as shown in Fig. 3.

When the system is energized by closing the main switch 341 (Fig. 3), the line terminals L1 and L3 are powered. The several elements of the safety control device 345 are in the condition illustrated in Fig. 7.

If the system is calling for heat, the main contacts of the switch 335 are closed, thus completing a circuit to close the starting relay 340 which causes the fan motor 337 to be energized. At the same time a circuit is completed through the terminal L1, the program motor 401, the lower contact of the switch 403, the upper contact of the switch 412 and the terminals T7 to drive the program motor 401.

Also a circuit is completed through the terminal L1, the coil of the relay 415, the switch 413 and the terminal T3 to close the switch 416 of the relay 415. This establishes a holding circuit for the switch 416 which, when the switch 413 is closed on its lower contact (as hereinafter explained) maintains the connection between terminals T3 and T5.

The program motor 401 is driven through an initial cycle of approximately 30 seconds, during which the fan motor 337 is driven to purge the outlet of any unburned fuel. The motor 401 then closes the switch 402 which powers the terminal T1 to energize the ignition coil 342 and also a circuit through the switch 411 which powers the terminal T2 and energizes the gas pilot valve 367.

If the pilot flame is ignited (and the circuit through the flame rod 346 is not shorted or grounded), the vacuum tube 420 operates to energize the relay 410 and close the switches 411, 412 and 413 on their lower contacts respectively. It may be explained at this point that the vacuum tube 420 is powered and connected in a known manner such that when a flame is established at the burner (and the flame rod 346 is not shorted or grounded), the electrical conductivity of the flame is such that a current passes to the tube 420 and is amplified so as to energize and maintain the relay 410 with its connected switches 411, 412 and 413 closed on their lower contacts. On the other hand, when no flame is reacting on the flame rod (or when the flame rod is grounded or a short circuit occurs), the relay is not energized to close the switches on their lower contacts but they remain closed against their upper contacts.

The closing of the switch 411 on its lower contact connects the terminals T2 and T3 directly so that when the switch 402 is opened by the program motor the gas pilot valve 367 remains energized. Upon further rotation of the motor 401, the switch 402 is opened and the ignition coil 342 is de-energized.

The closing of the switch 412 on its lower contact opens the circuit through the motor 401 and the switch 403 and completes the circuit through the switch 404. Thus the energizing of the program motor 401 is maintained and the motor continues to rotate until it opens the switch 404 which de-energizes the motor.

The closing of the switch 413 on its lower contact completes a circuit from the terminal L1 to the terminal T5 which energizes either the main gas supply valve 327 or the oil pump motor 332, depending upon the condition of the pressure-operated switch 325.

Upon flame failure (or accidental grounding of the flame rod or shorting of the circuit) the relay 410 is de-energized and the switches 411, 412 and 413 return to their upper positions. The switch 413 disconnects the circuit through the terminal T5 thus opening the circuit to the main fuel supply (the valve 327 or the motor 332), thereby de-energizing the fuel supply. The switch 412 completes the circuit through the program switch 403 and causes the motor to start cycling the program switches. However, since the switch 412 is closed on its upper contact, the motor 401 continues to cycle past the point where it would normally stop if the switch 412 were on its lower contact. Hence the cycle continues and the switch 402 energizes the ignition coil 342 and the pilot valve 367. If the flame is reestablished, then the relay 410 is energized and the flame is maintained as above explained.

If, on the other hand, the flame is not reestablished during the aforementioned cycling period, then the switch 403 closes on its upper contact, which energizes terminal T4 and sounds the alarm 347 and at the same time de-energizes the motor to stop the cycle, leaving the alarm energized.

Upon manual operation of the switch 343, the circuit through the terminal T7 is opened and a circuit is closed through the terminals T1 and T2. This prevents the program motor 401 from cycling, but energizes the ignition coil 342 and the pilot valve 367. If a flame is established, the relay 410 is energized to close the switches 411, 412 and 413 on their lower contacts and the flame is maintained. Since the switch 412 is then closed on its lower contact and the switch 404 is closed, the motor 401 cycles and the switch 403 is caused to close on its lower contact, thereby de-energizing the alarm. Thereafter the switch 404 opens to stop the cycling of the motor.

If at any time when the flame is on, the heating effect is sufficient, the main contacts of the switch 335 open, which de-energizes the terminal T3 thereby opening the circuit to the holding relay 415 and opening the main fuel supply. The flame then can only be reestablished by the program motor operating through a purging cycle.

The burner and control system preferably are so arranged that the burner will burn either gas or liquid fuel interchangeably as determined by the control system and at the same time will operate at the maximum efficiency with each fuel and without howling or blasting. To this end, an orifice device 371 of known construction is connected in the gas supply line for controlling the rate of flow of gas. The orifice in the orifice device 371 and the orifice in the liquid fuel nozzle are selected of such sizes that the burner has the same heat output regardless of whether gas or liquid fuel is being burned. The air supply is adjusted (as by adjustment of the damper 372 in a bypass inlet leading into the outlet 303 adjacent the suction fan) to provide the optimum operation whether either gas or liquid fuel is being burned. Thereafter, no adjustment of either of the orifices or of the air supply is required as the burner changes from one fuel to the other, but the burner will operate with excellent results when burning either type of fuel. The burner shown in Fig. 1 may be similarly operated.

It will be noted that the arrangement of the liquid fuel nozzle and the gaseous fuel nozzles is such that the air stream flowing from the air inlet chamber into the combustion chamber surrounds the jet of fluid fuel from the liquid fuel nozzle. Accordingly, all of the atomized oil is thrown into the spirally flowing air and rapidly and completely mixed therewith, thus insuring complete and rapid combustion of the liquid fuel. On the other hand, the air stream is located within the circular pattern of the jets of gas issuing from the several gas burner nozzles and the air is thrown outwardly into the jets of gas. Since the jets of gas are distributed around the periphery of the air stream there is adequate air in the vicinity of each jet of gas to provide rapid and complete combustion.

The burner shown in Figs. 3 to 6 may be operated to burn liquid fuel simultaneously with gas in the event that the gas supply is not adequate to provide the necessary heat but is adequate to support proper combustion, or to supply liquid fuel alone where the gas supply is not adequate to support proper combustion thereof. This mode of operation may be accomplished with a control system such as shown in Fig. 3 having included therein a thermostatically operated switch having a dual set of contacts. One set of contacts of the thermostatically operated switch is effective to operate the system in a manner similar to that above described. The other set of contacts is connected to energize the oil pump motor, without cutting off the gas supply in the event that the system is calling for more heat than is supplied by the combustion of gas alone but the pressure of the gas is sufficient to support combustion.

The switch 335 is provided with a set of auxiliary contacts (not shown) connected by leads 373 and 374 to the relay 333 and the relay 334. An air regulator 375 is provided in the outlet 303 and has a closure 376 actuated by an actuating coil 377 controlled by the relay 334, which regulator when open permits air to enter the outlet therethrough, thereby reducing the amount of air drawn through the burner.

When the gas supply is sufficient to provide proper pressure in the gas supply line 315, the gas pressure switch 325 is closed and the relay 333 is energized to open the main gas valve 327. If the temperature of the water bath is low and is not being maintained at the desired temperature by the burning of gas alone, the auxiliary contacts of the switch 335 are closed thus bridging the contacts of the relay 333 to thereby energize the relay 334 and cause the oil pump to operate. The upper contact on the relay 333 is closed as is the upper contact on the relay 334, thereby energizing the actuating coil 377 to close the air regulator 375, thus increasing the air supply to the burner to permit it to burn both gas and oil simultaneously.

If the gas pressure switch 325 opens due to a decrease in pressure of the gas supply, the relay 333 is de-energized and opens the circuit to the actuating coil 377 permitting the closure 376 to open and reduce the air supply to that commensurate to the burning of oil only.

When the auxiliary contacts of the switch 335 are open, the relay 334 will only be closed when the switch 325 is opened. Therefore, the air regulator 375 will remain open for either gas or oil burning alone.

It will be seen from the foregoing that the present invention provides a burner capable of operating with either gaseous or liquid fuel, and a system of control for such burner capable of operating automatically to supply gaseous fuel in the event that a sufficient quantity of such fuel is available but which supplies liquid fuel in the event that the supply of gaseous fuel is insufficient. Moreover, the present invention also provides a burner capable of burning both liquid and gaseous fuel simultaneously and a system for controlling the operation of the burner when burning gaseous and liquid fuel simultaneously. The burner is so arranged that it will burn either gas or liquid fuel or both simultaneously, without howling or blast and without requiring the manual adjusting or resetting of the air control. The burner may be operated in a completely automatic manner with a minimum of attention and shut-down.

The burner is well adapted for use with a control system having known safety devices and, therefore, can be operated with a high degree of safety. The use of the gas pilot with its own ignition insures against flash-backs when gaseous fuel is being burned.

The burner system may be readily controlled to insure maximum efficiency of operation and a highly uniform supply of heat, even with a fluctuating supply of one or the other of the two types of fuel. Since the system may be operated with either type of fuel, it may be so operated as to employ the less expensive of the two types of fuels when the supply of the same is adequate and to utilize only the more expensive fuel when necessary to supplement the supply of the more economical fuel. The burner is so constructed and arranged that whether burning one type of fuel or the other, or both, simultaneously, a complete and rapid intermixing of the fuel or fuels with the air necessary to support combustion is effected, thereby insuring rapid and complete combustion, with the result that optimum operating conditions are realized. Tests with this novel combination oil and gas burner show that it is possible to obtain consistent overall efficiencies from the fuel to the output of the heater and one type of heat exchanger for which the heater is well adapted of around 80% to 81% and that this efficiency is maintained at 100% over normal output ratings as well as at normal output ratings.

I claim:

1. A furnace and control system for gaseous and liquid fuel burners comprising means forming a reservoir for material to be heated, means forming a combustion chamber adapted to heat the material, thermostatic means responsive to the temperature of the material being heated, a gas burner nozzle positioned to discharge into said combustion chamber, a gas supply line for supplying gas to said gas burner nozzle, a liquid fuel nozzle positioned to discharge into said combustion chamber, electrically energizable means for supplying liquid fuel to said liquid fuel nozzle, a first, electrically energizable, control means associated with said gas supply line and connected to said thermostatic means and active when the pressure in said gas supply line is above a predetermined minimum and said thermostatic means is in heat-demand condition for opening said gas supply line and active when said pressure falls below said minimum for closing said line, a second, electrically energizable, control means associated with said liquid fuel supply means and actuated by said first control means when said thermostatic means is in heat-demand condition and said first control means is active, to close said line for energizing said liquid fuel supply means, and means responsive to a predetermined minimum temperature in the material being heated for actuating said second control means to energize said liquid fuel supply means while said gas supply line is open.

2. A furnace and control system for gaseous and liquid fuel burners comprising means forming a reservoir for material to be heated, means forming a combustion chamber adapted to heat the material, thermostatic means responsive to the temperature of the material being heated, a gas burner nozzle positioned to discharge into said combustion chamber, a gas supply line for supplying gas to said gas burner nozzle, a liquid fuel nozzle positioned to discharge into said combustion chamber, electrically energizable means for supplying liquid fuel to said liquid fuel nozzle, means for creating a draft through said combustion chamber, a first, electrically energizable, control means associated with said gas supply line and connected to said thermostatic means and active when the pressure in said gas supply line is above a predetermined minimum and said thermostatic means is in heat-demand condition for opening said gas supply line and active when said pressure falls below said minimum for closing said line, a second, electrically energizable, control means associated with said liquid supply means and actuated by said first control means when said thermostatic means is in heat-demand condition and said first control means is active, to close said line for actuating said liquid fuel supply means, means responsive to a predetermined minimum temperature in the material being heated for actuating said second control means to energize said liquid fuel supply means when said gas supply line is open, and means actuated by said second temperature responsive means for increasing the draft through said combustion chamber when both said fuel supply means are active.

HARRY E. SCHLENZ.

References Cited in the file of this patent

UNITED STATES PATENTS

| Number | Name | Date |
| --- | --- | --- |
| 1,386,608 | DuPont | Aug. 9, 1921 |
| 1,687,390 | Ritter | Oct. 9, 1928 |
| 1,786,900 | Doherty | Dec. 30, 1930 |
| 1,786,901 | Doherty | Dec. 30, 1930 |
| 1,819,459 | Doherty | Aug. 18, 1931 |
| 1,840,744 | Scott | Jan. 12, 1932 |
| 1,860,311 | Klees | May 24, 1932 |
| 1,885,478 | Powers | Nov. 1, 1932 |
| 2,303,648 | Lemster et al. | Dec. 1, 1942 |
| 2,412,990 | Kruse | Dec. 24, 1946 |
| 2,458,542 | Urquhart | Jan. 11, 1949 |
| 2,490,095 | Rosche | Dec. 6, 1949 |
| 2,586,998 | Schlenz | Feb. 26, 1952 |